July 15, 1941.  J. A. HEANY  2,248,990

PROCESS OF MAKING POROUS ABRASIVE BODIES

Filed Aug. 17, 1938

INVENTOR
JOHN ALLEN HEANY
BY
Brazelton Whitcomb Davis
ATTORNEYS

Patented July 15, 1941

2,248,990

UNITED STATES PATENT OFFICE 2,248,990

PROCESS OF MAKING POROUS ABRASIVE BODIES

John Allen Heany, New Haven, Conn.

Application August 17, 1938, Serial No. 225,376

8 Claims. (Cl. 51—293)

This invention relates to a precess for producing porosity in dense materials, and to products resulting from said process.

More particularly, the invention pertains to a process for producing porosity in the amorphous aluminous material described in my co-pending applications Serial No. 131,126, filed March 16, 1937, and Serial No. 135,369, filed April 7, 1937, and in the production of articles by said process, such as, for example, abrasive wheels, abrasive grains, or fire bricks.

In my co-pending applications above referred to, the aluminous material as bauxite, for example, is amorphous, vitreous, dense and with a high degree of hardness approaching 9 Mohs. This material is advantageously used in the ceramic and other fields, but for certain uses such as abrasives and fire bricks the properties of the material are not altogether desirable. For example, in the case of fire bricks made of my processed bauxite, while it readily resists high temperatures, nevertheless the excessive heat variation tends to produce fissures in the material. Further, the density of the substance, associated with its conchoidal fracture, makes the cutting of the material difficult. Also, when used for abrasives the substance, being non-crystalline in nature, does not flake off or crumble and hence develops a glaze which is detrimental to the abrading action of the substance.

It is accordingly one of the important objects of the present invention to provide a process for making vitreous, amorphous, aluminous material suitable for use as an abrasive or as a fire brick. Another object of the invention is to provide a process for facilitating cutting of bricks formed of aluminous material. Still another object of the invention is to provide a texture to amorphous, aluminous material which will permit large variations in expansion and contraction due to heat without fracture of the material. An object of the invention also is to provide means through which a vitreous, amorphous, aluminous material is made usable as an abrasive substance. A further object is to provide means for eliminating glaze in the use of an amorphous substance. A further object is to provide means another object is to provide means for producing a simulation of crystalline action in a non-recrystallized substance through the development of porosity in the substance to such an extent that the wall structure between the pores tends to disintegrate when applied to a surface to be abraded.

An object of importance in the present invention is to produce porosity in a viscous substance, the pores resulting having an approximate equality of diameter. A related object is to provide a porous, vitreous substance in which the thickness of the walls separating the pores is approximately uniform throughout the mass of the substance. An important object also is to provide an abrading material which is without bond, being entirely homogeneous.

Further objects include the provision of simplified means for making abrasive articles such as stones, wheels, etc. which eliminates many of the steps heretofore considered necessary in the manufacture of abrasive wheels; the formation of abrasive articles by ceramic methods including temperature treatment below the fusion point of the substances used; the formation of an abrasive article without the use of bonding substances; and other objects which will appear on consideration of the following description taken in conjunction with the accompanying drawing in which the various process steps and the product produced are diagrammatically illustrated, and in which:

Figure 1:
Fig. 1 is a view of a small ball of volatilizable substance such as naphthalene.

Generally speaking, the present invention relates to a process by means of which a dense material such as bauxite or alumina is made porous by the introduction into and subsequent removal of a volatilizable substance, as for example, naphthalene, whereby the material is honeycombed in such a manner that when employed for fire bricks or the like it is capable of expansion or contraction without fracture, and when employed as an abrasive either in wheel form or as a grain it prevents glaze through the breakdown of the multiple wall structure arising from the porosity of the substance.

In describing my invention in the present application I will refer more specifically to the application of the invention to its use as an abrasive in connection with the aluminous material described in my co-pending applications above referred to.

In accordance with said applications, the bauxite is ground in a pebble mill to a particle size less than 20 microns, as for example 12 microns. The bauxite slip is then filter pressed and the filter cakes dried and crushed to powder. This material is homogeneous and is of such small particle size that when formed into a block or wheel and vitrified and applied to a hard surface to be ground the grinding surface becomes glazed through the absence of any removable material such as a bond or crystalline particles.

To introduce porosity and wall structure which will crumble in the grinding operation I intersperse removable substances throughout the bauxite during the process of manufacture. Various substances may be employed for this purpose, such as anthracene, camphor, phthalic anhydride or naphthalene, which volatilize readily and have low melting points. I prefer naphthalene since it has a melting point of 80° C. and sublimes without leaving any residue. Waxes, asphalt and various other substances are undesirable since they melt to some extent before volatilization, thus trapping the gases and deforming the cellular structure. Wood fibres, coke, etc., are not desirable as they leave a residue. Gases such as hydrogen peroxide are undesirable since the pores resulting therefrom are not uniform in size and distribution.

The volatile substance which hereinafter I shall refer to as naphthalene, is preferably in spheroidal form. Other forms are usable, such as cubes or various types of polyhedrons or cylinders, ellipses and the like, but the ball shape lens itself readily to manufacturing operations and develops cell walls of the desired strength and uniformity.

It is important that the naphthalene balls be approximately uniform size so that the walls formed thereby be uniformly spaced in the final product. By selecting the ball diameter the desired porosity of the abrasive wheel may be predetermined in accordance with the uses to be made of the wheel. For example, the size of the ball may vary from that passing through a 200 mesh screen to one-eighth of an inch diameter or larger. In order to secure an approximate spherical form to the balls I employ the shot making method, that is, the naphthalene is melted by heat and dropped in a closed chamber from a high point, the drops assuming a spherical form according to the laws of surface tension and becoming solid before dropping into the receptacle.

Where naphthalene is employed the balls have a tendency to adhere, and hence if made prior to use it would be impossible to free the balls. To overcome this defect I have found that if the balls are covered with a thin film of powdered bauxite, as for example, 1% to 3% by volume, the coating adheres to the naphthalene balls and all tendency to adhesion between the balls is eliminated.

Figure 2:
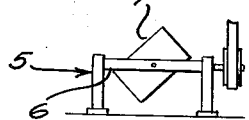
Fig. 2 is a diagrammatic view of a tilted mixer.

Proceeding with the process, the naphthalene balls, which may be previously coated for storage as above described, are placed in a mixing chamber which may take the form of that shown in Fig. 2 of the drawing, comprising a rotatable shaft upon which is mounted an angularly disposed receptacle. Added to the naphthalene balls is the aluminous material such as the bauxite hereinabove described, in such amount as to produce the desired porosity in the completed abrasive. I have experimentally determined that a porosity of approximately 85% gives excellent results without glazing, the walls being sufficiently strong to resist undue pressure and sufficiently weak to present multiple sharp cutting edges that yield in the abrading action.

Figure 3:
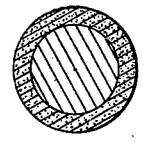
Fig. 3 is a sectional view of a naphthalene ball coated with abrasive aluminous material.
Figure 4:
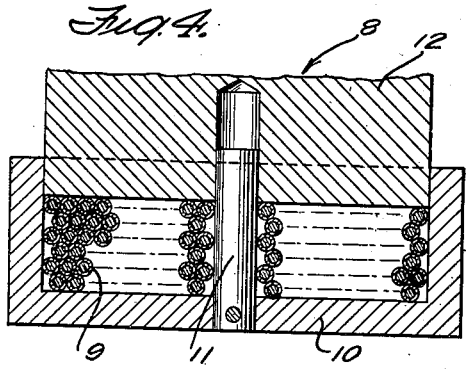
Fig. 4 is a view of the coated ball of Fig. 3 in a mold prior to compression.
Figure 5:
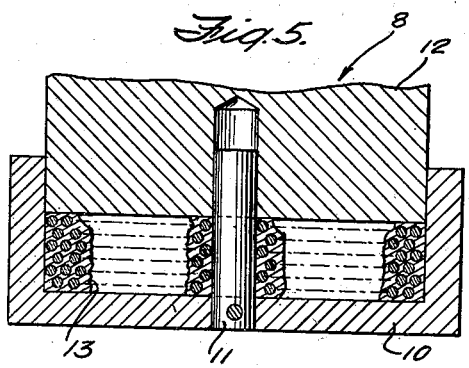
Fig. 5 is a view similar to Fig. 4 with the plunger forced downwardly.
Figure 6:
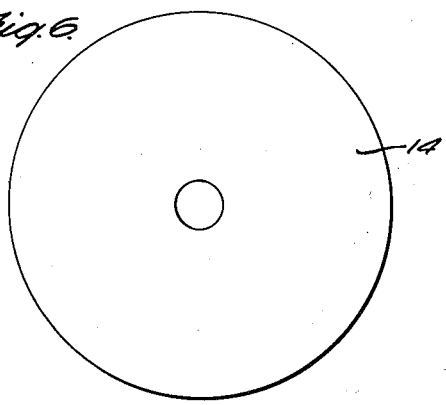
Fig. 6 is a view of the compressed article removed from the mold of Fig. 5.
Figure 7:
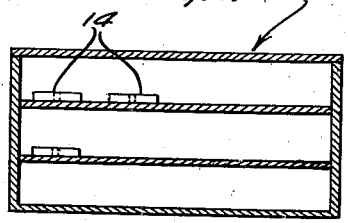
Fig. 7 is a diagrammatic view of the various wheels receiving oven heat treatment.

When the mixing operation, which requires ordinarily only a few minutes time, has been completed the bauxite will be found to have coated the spheroidal naphthalene in layers of approximately uniform thickness, as indicated in Fig. 3. These balls are then transferred to a mold such as indicated in Fig. 4 of the drawing, in which is shown a press 8 usable in connection with abrasive wheels and provided with a cup-shaped base member 10, a core 11 projecting from the center of the base, and the plunger plate 12. The coated balls are uniformly distributed throughout the press chamber. Pressure, which may exceed one ton per square inch, is then applied to close the openings in between the balls so that a solid and dense structure such as shown at 13 in Fig. 5 is disclosed. It is noted that the pressure does not materially affect the shape of the naphthalene balls. Fig. 6 is a view of the abrasive wheel 14 removed from the mold shown in Fig. 5. The wheel is then placed in a drying oven 15, as shown in Fig. 7, where a heat not exceeding 75° C. is applied over a time period depending upon the dimensions of the article, in the particular instance described two to three days being necessary. A temperature in excess of 75° C. approaches the melting point of naphthalene and hence is undesirable since melting of the naphthalene results in the absorption of the naphthalene by the bauxite walls enclosing the substance, bringing about an imprisonment of the vapors and tending to destroy the cellular structure.

Figure 8:
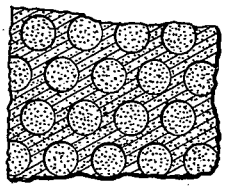
Fig. 8 is a detail showing the cavities produced in the wheel of Fig. 6 by the sublimation of the naphthalene through the heat treatment of Fig. 7.
Figure 9:
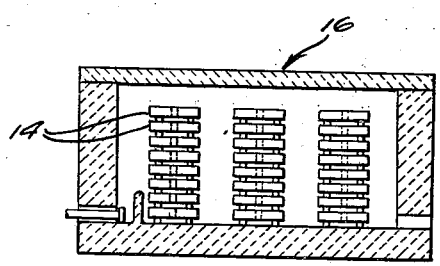
Fig. 9 is a view of the sintering furnace with the wheels stacked for treatment.

As a result of the oven heat the naphthalene is sublimated, leaving closed cavities or pores uniformly distributed throughout the wheel 14, as indicated in Fig. 8. After the oven treatment the wheels are placed directly in a kiln 16, Fig. 9, as commonly employed in ceramic manufacture, and fired. When the aluminous material employed is bauxite the firing temperature is approximately 1250° C. although, as indicated in my co-pending application Serial No. 131,126, temperatures varying from 1200° C. to 1450° C. may be used. If alumina is employed as the abrasive, the firing temperature should preferably be increased to approximately 1500° C., the temperature range, as indicated in my co-pending application Serial No. 135,369, being between 1200° C. and 1600° C.

It is apparent also that the firing time for the articles being sintered will vary with the material of the abrasive as well as of the size of the articles used and the porosity of the same. For small size articles in a relatively small furnace bauxite requires approximately 9 hours, and alumina about 12 hours; with larger furnaces the time would be materially extended to as much as one or two weeks.

Figure 10:
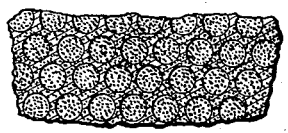
Fig. 10 is a detail of the sintered, vitrified and porous wheel structure.

After the final heat treatment the wheels are removed from the furnace and are ready for mounting. On examination it will be found that considerable shrinkage has taken place, the shrinkage in the bauxite being as high as 30% or more, and in the case of alumina as high as 23%. In view of the cavities present in the article, however, the shrinkage produces no distortion, and consequently the process can be readily modified to insure the desired dimensions after the shrinkage has taken place. This final product is indicated in Fig. 10 of the drawing, which is comparable with Fig. 8. It will be noted that the size of the openings or pores, as well as the thickness of the intermediate walls between the pores, is materially less in the final product as shown in Fig. 10 than in the untreated product of Fig. 8.

It is pointed out particularly that the thickness of the walls between the pores in the final product is approximately the same. This is due to the fact that initially the naphthalene balls received approximately equal coats of powdered bauxite, and since these coated balls are placed in approximate uniformity in the mold, the final product necessarily possesses uniformity in its cellular structure. This is important from the viewpoint of reproduction of a typical or desired type of abrasive wheel and is also important as disclosing a means by which through variation of the size of the naphthalene balls or the thickness of the coating of the balls, or both, the size of the pores or the thickness of the walls between the pores, or both, may be varied. Abrasive wheels are required for a multitude of different uses, and hence a large variation of degrees of cutting characteristics are required and by my process these variations may be readily produced. A thickness of wall giving a porosity of 85% by volume gives approximate balance between the glazing limit and the point of too large friability for ordinary uses. However, a porosity varying from 50% to 90% may be used for special purposes. As an example, a small wheel having 85% porosity has a wall thickness ranging from 0.003 to 0.006 inch. Other examples vary from 0.001 to 0.010 inch.

The invention has been described in connection with a homogeneous aluminous material as affording a suitable abrasive product capable of fine particle separation and susceptible to formation of an extremely hard and abrasive substance at firing temperatures within the ceramic range, that is, under 1600° C. It should be understood, however, that the process may be extended to mixtures including aluminous materials or to other than aluminous materials such as magnesia, although its applicability is particularly useful in connection with abrasive substances.

The article produced by my method as hereinabove described is a homogeneous substance without any of the usual bonds heretofore employed in abrasive wheels. The hardness of the material is in the neighborhood of 9 Mohs or 70 to 76 Rockwell; the substance is exceedingly dense and vitreous-like in its characteristics; the various cells or pores are spaced with suitable uniformity throughout the body of the wheel so that there is presented to the surface on which the wheel is operating a multiplicity of radial cutting edges which act similarly to a milling cutter formed with multiple teeth. Glazing is obviated through the fact that the operating surface is broken by the pores and the cellular walls are of sufficient thinness to break down in use, presenting fresh abrading surfaces.

Instead of forming the cellular structure as an abrasive wheel or other moldable article, I have found that my process may be modified to utilize the cellular structure in particles subsequently bonded with a relatively weaker bond, in accordance with the known processes in making crystalline abrasives. In modifying the invention to include this development I utilize the same steps of the process to the extent of coating the naphthalene balls with powdered aluminous material, placing the material in a former or mold, and subsequently volatilizing the naphthalene. In this modification, however, instead of a wheel, a brick or briquette is formed which, after the volatilization treatment, is sintered and then broken roughly by crusher jaws, and more finely by rollers, the resulting grains being sorted in accordance with the dimensions. These grains may then be combined in the form of an article such as a wheel by means of an interacting bond such as fluxing clays, synthetic resins, rubber, sodium silicate, shellac or other known bonding substances. Hence, in accordance with this modified method it is possible to build an abrasive wheel paralleling the structure of a crystalline grain wheel but in the process of manufacture not requiring fusion temperatures and the various complex and expensive process steps associated with the formation and treatment of crystals.

In describing the above processes I have mentioned a low temperature heat in an oven below 75° C., followed by a high temperature heat in a separate furnace. It is within the scope of my invention to combine these two heating steps into a single step consisting of a low heat followed by a high heat in the same furnace.

The terms "amorphous," "non-crystalline" and "vitreous" are employed in the claims to designate a material substantially free of crystalline structure.

Various modifications other than hereinabove described may, of course, be made provided such modifications come within the scope of the claims hereto appended.

I claim as my invention:

1. A process of making an abrasive wheel which comprises uniformly coating naphthalene balls with amorphous low temperature-dehydrated aluminous material having been wet ground to a particle size less than twenty microns, compressing said balls together in a mold to form the wheel, subjecting the wheel to heat treatment at a temperature below the melting point of the naphthalene balls and for a time period sufficient to entirely volatilize the naphthalene balls, and heating the wheel in a furnace at a temperature below that of the fusion of the aluminous material to vitrify the aluminous material in the wheel.

2. A step in the process of manufacturing abrasive wheels which comprises forming naphthalene into balls of approximately uniform dimensions and tumbling the balls in a mixing chamber containing amorphous low temperature-dehydrated aluminous material wet powdered to a size of less than twenty microns, whereby the balls are approximately uniformly coated with the aluminous material, and then forming into a wheel and firing.

3. A process for making abrasive wheels which comprises forming spheroidal balls of naphthalene, wet grinding amorphous low temperature-dehydrated aluminous material to grains having a size less than twenty microns, mixing the aluminous material and balls together whereby the balls are coated uniformly by the aluminous material, molding the coated balls to the shape of the wheel, volatilizing the naphthalene from the formed wheel, and firing the wheel at a temperature below the melting point of the aluminous material.

4. The process of making an abrasive wheel which comprises forming a volatilizable material into a plurality of uniformly shaped particles, wet grinding amorphous low temperature-dehydrated aluminous material to a particle dimension less than twenty microns, mixing the aluminous and volatilizable materials so that the volatilizable material is coated uniformly by the aluminous material, molding the coated particles to form a wheel, removing the volatilizable material by heat at a temperature below the melting point of the volatilizable material, and finally sintering the wheel at a temperature below the fusion point of the aluminous material.

5. A process of producing an abrasive wheel which comprises dehydrating at a temperature of less than 1000° C., colloidizing by wet grinding to less than 50 microns and drying bauxite, coating the bauxite on a plurality of uniformly sized volatilizable solids, molding said coated solids to a wheel, heating the molded wheel to remove the solids, and heating the wheel to cause vitrification.

6. A process of producing an abrasive wheel which comprises dehydrating at a temperature of less than 1000° C., colloidizing by wet grinding to less than 50 microns and drying bauxite, coating the bauxite on a plurality of uniformly sized naphthalene balls, molding said coated balls to form a wheel, heating the molded wheel to not over 75° C. to remove the volatile balls, and heating the wheel to a temperature below the fusion point of the bauxite.

7. A process of making a vitrified amorphous cellular bauxite abrasive wheel, which comprises dehydrating bauxite without changing its colloidal character, mixing the bauxite with balls of naphthalene having a size varying from about 200 mesh to about ⅛ of an inch, so that such bauxite adheres to the surface of said naphthalene and forms a coating thereon, compressing the naphthalene-bauxite mixture to form a wheel, heating the wheel at a temperature not exceeding 75° C. to volatilize the naphthalene and then firing the resulting mass at a temperature from about 1200 to 1450° C.

8. A process of producing an abrasive disc which comprises dehydrating an aluminous material at a temperature of less than 1000° C., colloidizing by wet grinding to less than 50 microns and drying the aluminous material, coating the material on a plurality of volatilizable solids, molding said coated solids to form a disc, heating the molded disc to remove the volatilizable solids, and subsequently heating the disc to a temperature below the melting point of the material.

JOHN ALLEN HEANY.